(12) United States Patent
LaBossiere et al.

(10) Patent No.: US 7,604,470 B2
(45) Date of Patent: Oct. 20, 2009

(54) SINGLE-MOTOR EXTRUSION HEAD HAVING MULTIPLE EXTRUSION LINES

(75) Inventors: Joseph E. LaBossiere, Rogers, MN (US); Benjamin N. Dunn, Savage, MN (US); Thomas J. McDonough, Inver Grove Heights, MN (US); Marvin E. Eshelman, Mounds View, MN (US)

(73) Assignee: Stratasys, Inc., Eden Prairie, MN (US)

( * ) Notice: Subject to any disclaimer, the term of this patent is extended or adjusted under 35 U.S.C. 154(b) by 561 days.

(21) Appl. No.: 11/396,845

(22) Filed: Apr. 3, 2006

(65) Prior Publication Data
US 2007/0228590 A1 Oct. 4, 2007

(51) Int. Cl.
*B29C 47/12* (2006.01)
(52) U.S. Cl. .................. 425/131.1; 425/146; 425/190; 425/376.1; 425/462
(58) Field of Classification Search ............... 425/130, 425/131.1, 145, 146, 147, 182, 190, 162, 425/169, 376.1, 375; 226/187, 189, 191
See application file for complete search history.

(56) References Cited

U.S. PATENT DOCUMENTS

| | | | |
|---|---|---|---|
| 4,197,069 A | 4/1980 | Cloeren | |
| 4,372,736 A | 2/1983 | Gooch et al. | |
| 4,653,994 A | 3/1987 | Capelle | |
| 4,906,171 A | 3/1990 | Miller | |
| 4,928,897 A | 5/1990 | Satou et al. | |
| 5,121,329 A | 6/1992 | Crump | |
| 5,169,081 A | 12/1992 | Goedderz | |
| 5,303,141 A | 4/1994 | Batchelder et al. | |
| 5,312,224 A | 5/1994 | Batchelder et al. | |
| 5,340,433 A | 8/1994 | Crump | |
| 5,503,785 A | 4/1996 | Crump et al. | |
| 5,594,652 A | 1/1997 | Penn et al. | |
| 5,633,021 A * | 5/1997 | Brown et al. ............... | 425/375 |
| 5,695,707 A | 12/1997 | Almquist et al. | |
| 5,723,082 A | 3/1998 | Mizuguchi et al. | |
| 5,764,521 A | 6/1998 | Batchelder et al. | |
| 5,816,466 A | 10/1998 | Seufer | |
| 5,866,058 A | 2/1999 | Batchelder et al. | |
| 5,900,207 A * | 5/1999 | Danforth et al. ............ | 264/603 |
| 5,943,235 A | 8/1999 | Earl et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,027,068 A * | 2/2000 | Lantsman ............... | 242/564.4 |

(Continued)

OTHER PUBLICATIONS

International Search Report and Written Opinion of PCT/US2007/06796 filed Mar. 15, 2007.

*Primary Examiner*—Yogendra Gupta
*Assistant Examiner*—Emmanuel S Luk
(74) *Attorney, Agent, or Firm*—Westman, Champlin & Kelly, P.A.

(57) ABSTRACT

An extrusion head comprising at least one drive wheel and an assembly positionable between at least a first state and a second state. The assembly comprises a first extrusion line configured to engage the at least one drive wheel while the assembly is positioned in the first state, and a second extrusion line configured to engage the at least one drive wheel while the assembly is positioned in the second state.

20 Claims, 14 Drawing Sheets

U.S. PATENT DOCUMENTS

| | | |
|---|---|---|
| 6,028,410 A | 2/2000 | Leavitt et al. |
| 6,041,991 A | 3/2000 | Mehri et al. |
| 6,054,077 A | 4/2000 | Comb et al. |
| 6,067,480 A | 5/2000 | Stuffle et al. |
| 6,085,957 A | 7/2000 | Zinniel et al. |
| 6,129,872 A * | 10/2000 | Jang |
| 6,214,279 B1 | 4/2001 | Yang et al. |
| 6,228,923 B1 | 5/2001 | Lombardi et al. |
| 6,238,613 B1 | 5/2001 | Batchelder et al. |
| 6,257,517 B1 | 7/2001 | Babish et al. |
| 6,547,995 B1 | 4/2003 | Comb |
| 6,557,742 B1 | 5/2003 | Bobeczko et al. |
| 6,578,596 B1 | 6/2003 | Batchelder et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 * | 8/2004 | Swanson et al. ......... 425/376.1 |
| 6,814,907 B1 | 11/2004 | Comb |
| 6,923,634 B2 | 8/2005 | Swanson et al. |
| 7,026,574 B2 | 4/2006 | Belfiore et al. |
| 7,150,616 B2 * | 12/2006 | Haynes et al. ................. 425/7 |
| 2002/0113331 A1 | 8/2002 | Zhang et al. |
| 2005/0015175 A1 | 1/2005 | Huang |

\* cited by examiner

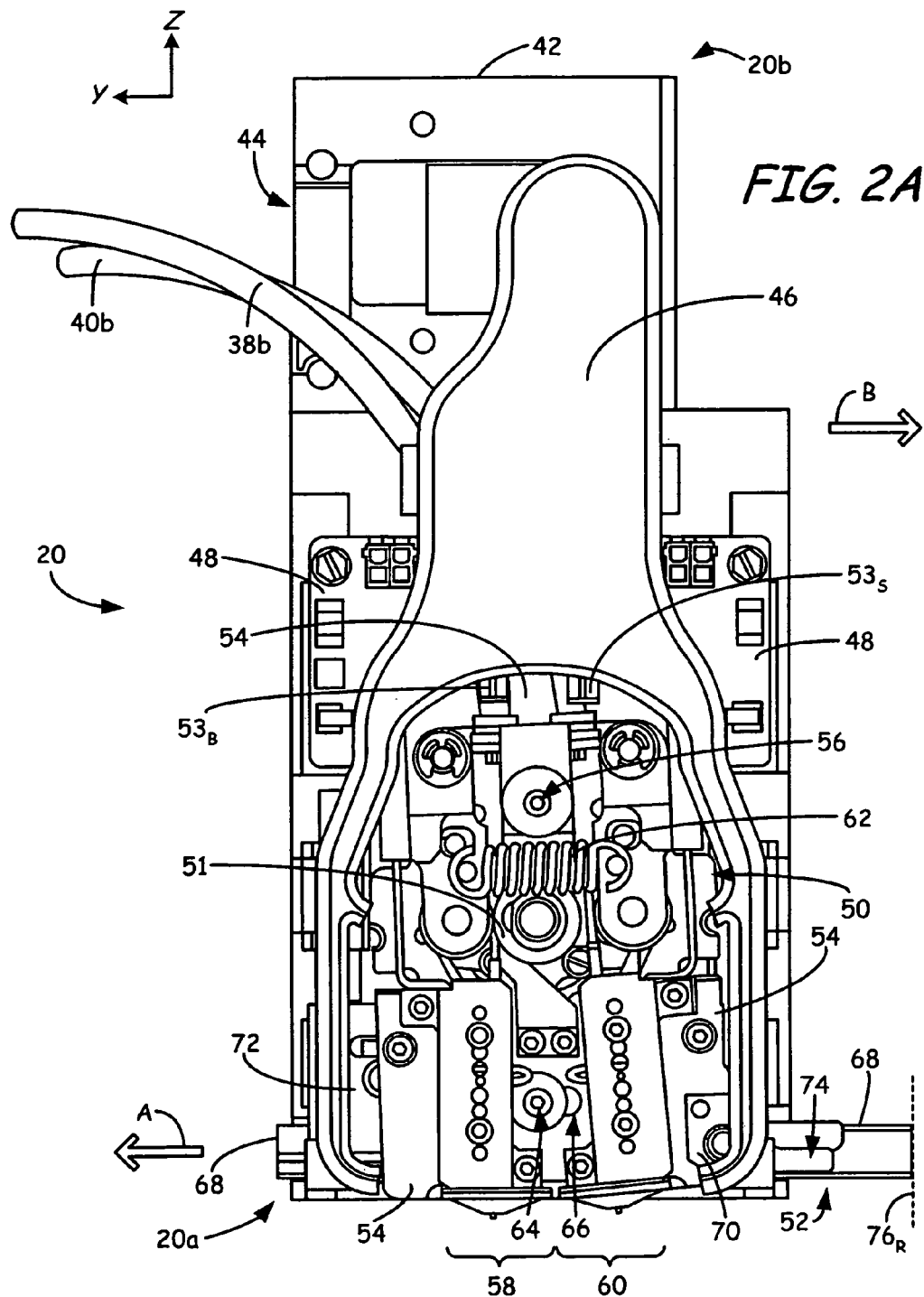

US 7,604,470 B2

SINGLE-MOTOR EXTRUSION HEAD HAVING MULTIPLE EXTRUSION LINES

BACKGROUND OF THE INVENTION

The present invention relates to the fabrication of three-dimensional (3D) objects using extrusion-based layered manufacturing systems. In particular, the present invention relates to an extrusion head that extrudes multiple materials for building 3D objects with a single drive motor.

An extrusion-based layered manufacturing system (e.g., fused deposition modeling systems developed by Stratasys, Inc., Eden Prairie, Minn.) is typically used to build a 3D object from a CAD model in a layer-by-layer fashion by extruding a flowable build material, such as a thermoplastic material. The build material is extruded through a nozzle carried by an extrusion head, and is deposited as a sequence of roads on a base in an x-y plane. The extruded build material fuses to previously deposited build material, and solidifies upon a drop in temperature. The position of the extrusion head relative to the base is then incremented along a z-axis (perpendicular to the x-y plane), and the process is then repeated to form a 3D object resembling the CAD model.

Movement of the extrusion head with respect to the base is performed under computer control, in accordance with build data from a host computer. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited pursuant to the generated geometry during the build process. The support material adheres to the build material during fabrication, and is removable from the completed 3D object when the build process is complete.

BRIEF SUMMARY OF THE INVENTION

The present invention relates to an extrusion head that includes at least one drive wheel and an assembly positionable between at least a first state and a second state. The assembly includes a first extrusion line configured to engage the at least one drive wheel while the assembly is positioned in the first state, and a second extrusion line configured to engage the at least one drive wheel while the assembly is positioned in the second state.

BRIEF DESCRIPTION OF THE DRAWINGS

FIG. 2A is a front perspective view of the extrusion head having a toggle-plate assembly positioned in a build state.

DETAILED DESCRIPTION

Figure 1:
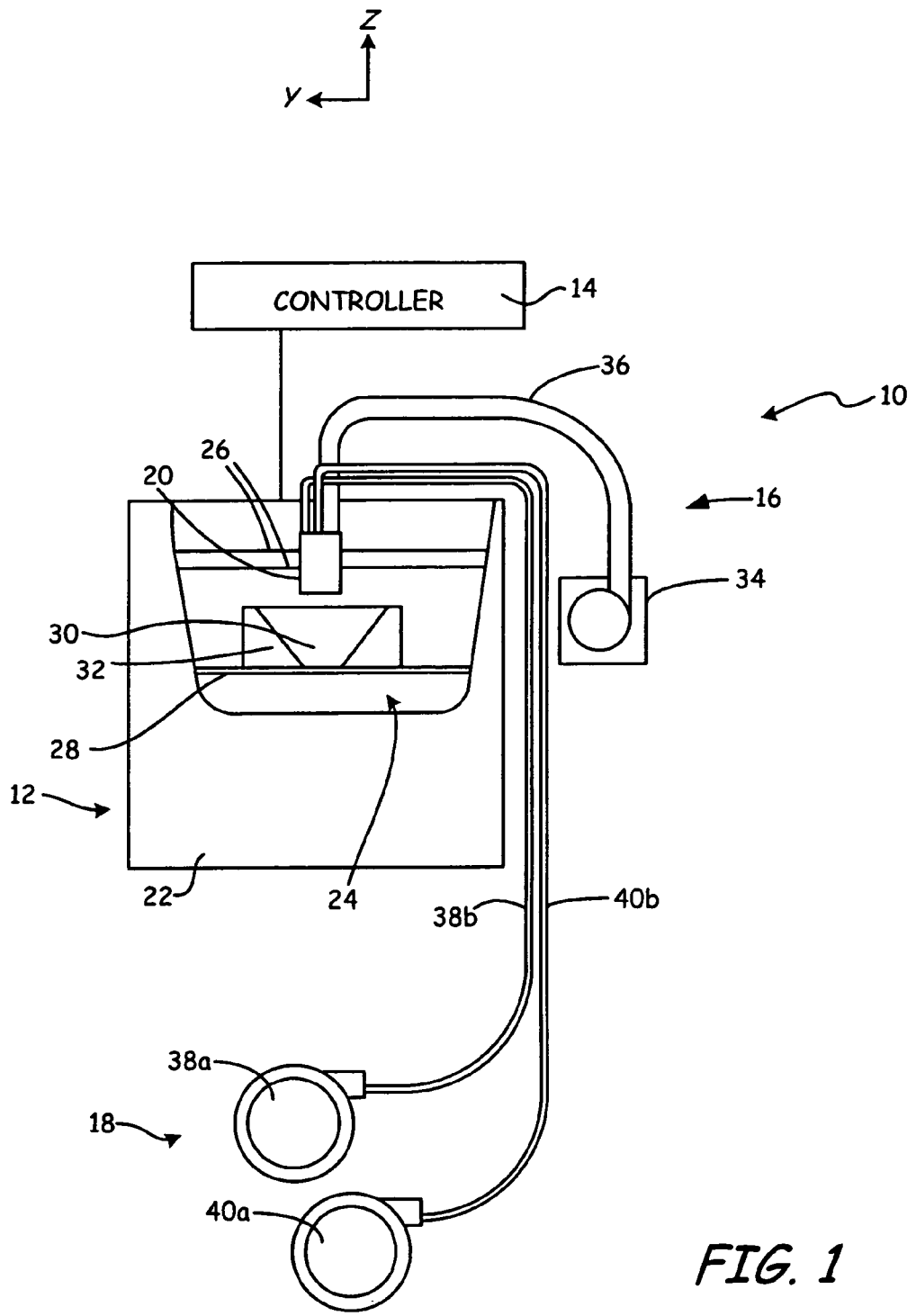
FIG. 1 is a side view of an extrusion-based layered manufacturing system with a portion broken away to show an extrusion head of the present invention.

FIG. 1 is a side view of system 10, which is an extrusion-based layered manufacturing system for manufacturing 3D objects, such as a fused deposition modeling system. System 10 includes build chamber 12, controller 14, cooling line 16, and material supply portion 18, where build chamber 12 contains extrusion head 20 of the present invention. Suitable systems that may incorporate extrusion head 20 include fused deposition modeling systems commercially available under the trade designation "FDM" from Stratasys, Inc. Eden Prairie, Minn.

As discussed below, extrusion head 20 builds 3D objects layer-by-layer using a pair of materials (e.g., build and support materials) that are selectively extruded with the use of a single drive motor (not shown in FIG. 1). The single drive motor reduces the number of components in extrusion head 20, while also providing good extrusion properties.

Build chamber 12 includes chamber walls 22 and interior portion 24 disposed within chamber walls 22, where chamber walls 22 are broken away to show interior portion 24. Within interior portion 24, build chamber 12 also contains guide rails 26 and build platform 28, 3D object 30, and support structure 32. Extrusion head 20 is supported by guide rails 26, which extend along a y-axis, and by additional guide rails (not shown) extending along an x-axis (not shown) within interior portion 24. Guide rails 26 and the additional guide rails allow extrusion head 20 to move in any direction in a plane along the x-axis and the y-axis. Build platform 28 is a working surface for building 3D object 30 and support structure 32, and is adjustable in height along a z-axis.

Controller 14 directs the motion of extrusion head 20 and build platform 28 based on a CAD model to build 3D object 30 and support structure 32 on build platform 28. As discussed below, controller 14 also directs the deposition pattern of extrusion head 20 with the use of a single drive motor to selectively deposit the build material and the support material.

Cooling line 16 includes cooling fan 34 and conduit 36, where conduit 36 interconnects extrusion head 20 with cooling fan 34. Cooling fan 34 provides cool air to the extrusion head 20 for controlling the material temperatures as discussed below.

Material supply portion 18 includes build material supply 38a, support material supply 40a, and supply lines 38b and 40b. Build material supply 38a and support material supply 40a respectively supply build material and support material as filament strands to extrusion head 20 via supply lines 38b and 40b. This allows extrusion head 20 to deposit build and support materials according to the extrusion patterns of controller 14 to build 3D object 30 and support structure 32.

Examples of suitable filament strands, and suitable assemblies for supplying filament strands to 3D modeling systems, are disclosed in Swanson et al., U.S. Pat. No. 6,923,634 and Comb et al., U.S. Publication No. 2005/0129941. While the materials of build supply line 38a and support supply line 38b are discussed herein as being build materials and support materials, suitable materials for use with extrusion head 20 include any type of extrudable material (e.g., thermoplastic materials).

Figure 2B:
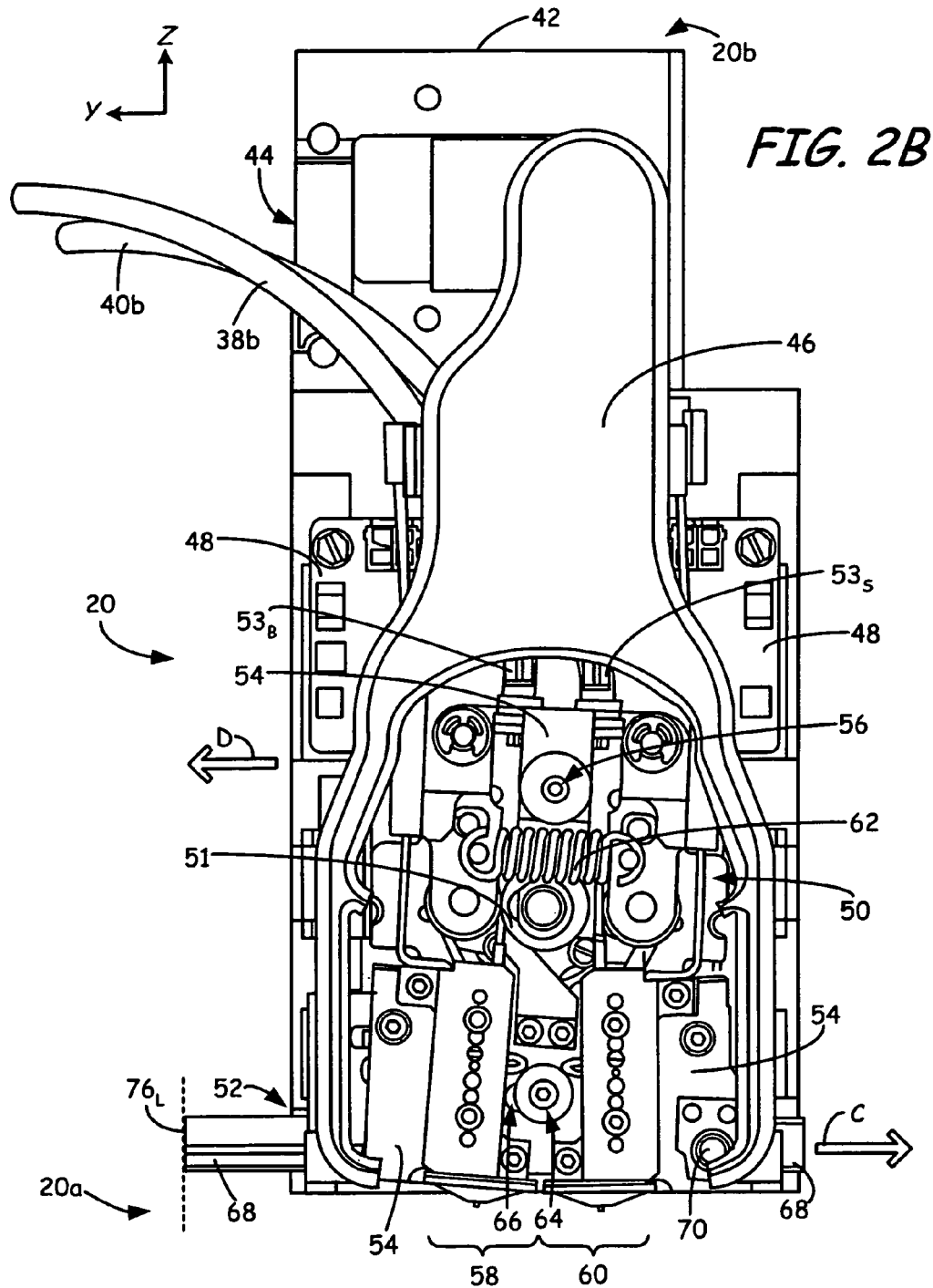
FIG. 2B is a front perspective view of the extrusion head, where the toggle-plate assembly is positioned in a support state.

FIGS. 2A and 2B are front perspective views of extrusion head 20 (outer casing is omitted), which provide a general overview of the internal components of extrusion head 20. As shown in FIG. 2A, extrusion head 20 includes bottom portion 20a and top portion 20b offset along the z-axis, where bottom portion 20a faces build platform 28, as shown above in FIG. 1. Directional orientations of extrusion head 20, such as "top", "bottom", "left", and "right", refer to the orientations shown in FIG. 2A, where "top" and "bottom" are taken along the z-axis, and "left" and "right" are taken along the y-axis. The directional orientations are used for clarity of discussion, and are not intended to be limiting on the present invention.

As shown from top-to-bottom in FIG. 2A, extrusion head 20 includes translator 42, conduit attachment 44, airflow manifold 46, control board 48, toggle-plate assembly 50, drive wheel 51, and toggle switch 52. Translator 42 is a frame of extrusion head 20 that extends from bottom portion 20a to top portion 20b. Translator 42 is secured to guide rails 26 (shown above in FIG. 1) for moving extrusion head 20 along the y-axis during a build process.

Conduit attachment 44 is a coupling location for connecting conduit 36 (shown above in FIG. 1) to extrusion head 20. This allows extrusion head 20 to receive cooling air from cooling fan 34. Airflow manifold 46 connects to conduit attachment 44, and is an encased pathway for directing cooling air from conduit 36 to various locations within extrusion head 20 from multiple exit orifices (e.g., exit orifices $53_B$ and $53_S$), as discussed further below. Control board 48 is a circuit board secured to translator 42, and is in signal communication with controller 14 (shown above in FIG. 1) for directing the operation of extrusion head 20.

Toggle-plate assembly 50 is the portion of extrusion head 20 that selectively extrudes build material and support material, and includes base 54, pivot axis 56, build line 58, support line 60, spring 62, and tab member 64. Base 54 is a secondary frame that is pivotally connected to translator 42 at pivot axis 56. As discussed below, the pivotal connection of base 54 allows toggle-plate assembly 50 to pivot around pivot axis 56 between a build state, a neutral state, and a support state.

While toggle-plate assembly 50 is positioned in the build state (as shown in FIG. 2A), build line 58 engages with drive wheel 51 to extrude build material. The "engagement" between build line 58 and drive wheel 51 occurs when one or more components of build line 58 are positioned in a working relationship with drive wheel 51 for feeding a filament strand of build material through build line 58.

Similarly, while toggle-plate assembly 50 is positioned in the support state (as shown below in FIG. 2B), support line 60 engages with drive wheel 51 to extrude support material. The "engagement" between support line 60 and drive wheel 51 occurs when one or more components of support line 60 are positioned in a working relationship with drive wheel 51 for feeding a filament strand of support material through support line 60.

Finally, while toggle-plate assembly 50 is positioned in the neutral state, build line 58 and support line 60 are disengaged from drive wheel 51. The "disengagement" occurs when the components of build line 58 and support line 60 are no longer in working relationships with drive wheel 51, thereby preventing the extrusion of build material or support material.

Base 54 includes slot 66, which is an elongated slot located generally between build line 58 and support line 60 adjacent bottom portion 20a. Tab member 64 is an extension that is disposed in slot 66 for securing toggle-plate assembly 50 to translator 42 at bottom portion 20a. This allows toggle-plate assembly 50 to pivot around pivot axis 56 while still being securely retained to translator 42. As shown in FIG. 2A, tab member 64 is disposed at the left side of slot 66 while toggle-plate assembly 50 is positioned in the build state.

Build line 58 is a first extrusion line connected to base 54 for extruding build material. Build line 58 is also connected to supply line 38b for receiving build material from build material supply 38a (shown above in FIG. 1). Similarly, support line 60 is a second extrusion line connected to base 54 for extruding support material. Support line 60 is also connected to supply line 40b for receiving support material from support material supply 40a (shown above in FIG. 1).

In an alternative embodiment, build line 58 and support line 60 are transposed in toggle-plate assembly 50. This embodiment is beneficial for directing materials to particular sides of drive wheel 51 to ensure that the materials properly feed through the given support lines. As shown in FIG. 2A, material fed through build line 58 passes to the left of drive wheel 51, and material fed through support line 60 passes to the right of drive wheel 51. As such, in this alternative embodiment, build material is fed through line 60 at the right side of drive wheel 51, and support material is fed through line 58 at the left side of drive wheel 51.

The term "extrusion line", as used herein, refers to any suitable pathway configured to receive and condition a material (e.g., melts the material to an extrusion viscosity) for the purpose of extruding the material. Suitable extrusion lines may include the same or differing number of components as those shown for build line 58 and support line 60.

Spring 62 is a biasing member connected to build line 58 and support line 60, and provides a biasing force for toggle switch 52, as discussed below. Drive wheel 51 is a motor-driven wheel disposed between build line 58 and support line 60, which provides a driving force for feeding filament strands of build material and support material, respectively, through build line 58 and support line 60. Drive wheel 51 is configured to engage with either build line 58 or support line 60, or to remain disengaged, depending on the position of toggle-plate assembly 50 (i.e., build state, support state, or neutral state).

As discussed above, while toggle-plate assembly 50 is positioned in the build state (shown in FIG. 2A), build line 58 is engaged with drive wheel 51 to extrude build material. Accordingly, extrusion head 20 may extrude roads of build material to build layers of 3D object 30. Additionally, while in this state, support line 60 is disengaged from drive wheel 51, which prevents support material from being extruded simultaneously with the extrusion of build material.

Alternatively, when toggle-plate assembly 50 is positioned in the support state (shown below in FIG. 2B), support line 60 engages with drive wheel 51 to extrude support material. Accordingly, extrusion head 20 may extrude roads of support material to build layers of support structure 32. Build line 58 is correspondingly disengaged from drive wheel 51, which prevents build material from being extruded simultaneously with the extrusion of support material.

When toggle-plate assembly 50 switches between the build state and the support state, it travels through the neutral state. In this state, toggle-plate assembly 50 is positioned between the build state and the support state, which disengages build line 58 and support line 60 from drive wheel 51. This prevents drive wheel 51 from accidentally extruding build material and support material while toggle-plate assembly 50 switches states.

Toggle switch 52 is a mechanically-actuated switch that moves toggle-plate assembly 50 between the build state, the neutral state, and the support state. Toggle switch 52 includes toggle bar 68, track pin 70, and sensor plate 72. Toggle bar 68 is slidably retained in translator 42, at bottom portion 20a, and extends beyond the left and right sides of translator 42. Toggle bar 68 includes track 74, which is an elongated "S"-shaped groove extending into toggle bar 68 (only half of track 74 is viewable in FIG. 2A).

Track pin 70 extends through base 54 at the right side of extrusion head 20, adjacent bottom portion 20a. Track pin 70 engages with track 74 of toggle bar 68 at a location beneath base 54, and is biased within track 74 via spring 62. As discussed below, this allows the sliding motion of toggle bar 68 to correspondingly pivot toggle-plate assembly 50 around pivot axis 56.

Sensor plate 72 includes one or more sensors (not shown in FIG. 2A) for monitoring the position of toggle bar 68 relative to translator 42, thereby monitoring when toggle-plate assembly 50 is positioned in the build state, the neutral state, or the support state. The use of sensor plate 72 is discussed further below.

As shown in FIG. 2A, while toggle-plate assembly 50 is in the build state, toggle bar 68 extends from the right side of translator 42. In this state, extrusion head 20 may extrude build material while moving around build chamber 12, thereby depositing roads of build material. However, when controller 14 directs extrusion head 20 to switch from extruding build material to extruding support material, toggle switch 52 is actuated by sliding toggle bar 68 toward the left of translator 42 (as represented by arrow A).

Toggle bar 68 may be slid toward the left of translator 42 in a variety of manners. In one embodiment, extrusion head 20 slides across build chamber 12 in a direction designated by arrow B until toggle bar 68 contacts a barrier within build chamber 12 (shown as barrier $76_R$ in FIG. 2A). The barrier may be any suitable structure within build chamber 12, such as a chamber wall (e.g., chamber walls 22) or a gantry system of build chamber 12.

When toggle bar 68 contacts barrier $76_R$, the continued motion of extrusion head 20 in the direction of arrow B pushes toggle bar 68 toward the left of translator 42, as represented by arrow A. Because toggle bar 68 is engaged with toggle-plate assembly 50 via track pin 70 and track 74, the sliding of toggle bar 68 causes toggle-plate assembly 50 to pivot around pivot axis 56 in a clockwise direction.

As toggle bar 68 slides in the direction of arrow A, build line 58 disengages from drive wheel 51, thereby preventing drive wheel 51 from extruding build material. At this point, toggle-plate assembly 50 has switched from the build state to the neutral state. As discussed above, while toggle-plate assembly 50 is positioned in the neutral state, build line 58 and support line 60 are disengaged from drive wheel 51. As toggle bar 68 continues to slide in the direction of arrow A, support line 60 then engages with drive wheel 51. At this point, toggle-plate assembly 50 has switched from the neutral state to the support state for extruding support material.

FIG. 2B shows toggle-plate assembly 50 in the support state, in which support line 60 is engaged with drive wheel 51. As shown, toggle bar 68 now extends from the left side of translator 42, and tab member 64 is now disposed at the right side of slot 66.

Once extrusion head 20 completes the extrusion of support material for a given layer, controller 14 may then direct toggle-head assembly 50 to switch from the support state back to the build state. Accordingly, toggle switch 52 is actuated by sliding toggle bar 68 toward the right of translator 42 (as represented by arrow C). Toggle bar 68 may also be slid toward the right of translator 42 in a variety of manners. In one embodiment, extrusion head 20 slides across build chamber 12 in a direction designated by arrow D (opposite direction of arrow A) until toggle bar 68 contacts a second barrier within build chamber 12 (shown as barrier $76_L$ in FIG. 2B). The second barrier may also be any suitable structure within build chamber 12, such as a chamber wall (e.g., chamber walls 22) or a gantry system of build chamber 12.

When toggle bar 68 contacts barrier $76_L$, the continued motion of extrusion head 20 in the direction of arrow D pushes toggle bar 68 toward the left of translator 42, as represented by arrow C. The sliding of toggle bar 68 correspondingly causes toggle-plate assembly 50 to pivot around pivot axis 56 in a counter clockwise direction to return to the build state.

During a build cycle, extrusion head 20 deposits roads of build material and support material to respectively build 3D object 30 and support structure 32 on build platform 28, in a layer-by-layer manner. While building the layers, extrusion head 20 may switch back-and-forth between the build state and the support state based on instructions from controller 14. The use of toggle-plate assembly 50 and toggle switch 52 allows extrusion head 20 to alternatively deposit build material and support material with the use of a single drive wheel (and a single motor), thereby reducing components costs and increasing accessibility to the components of extrusion head 20.

Figure 3:
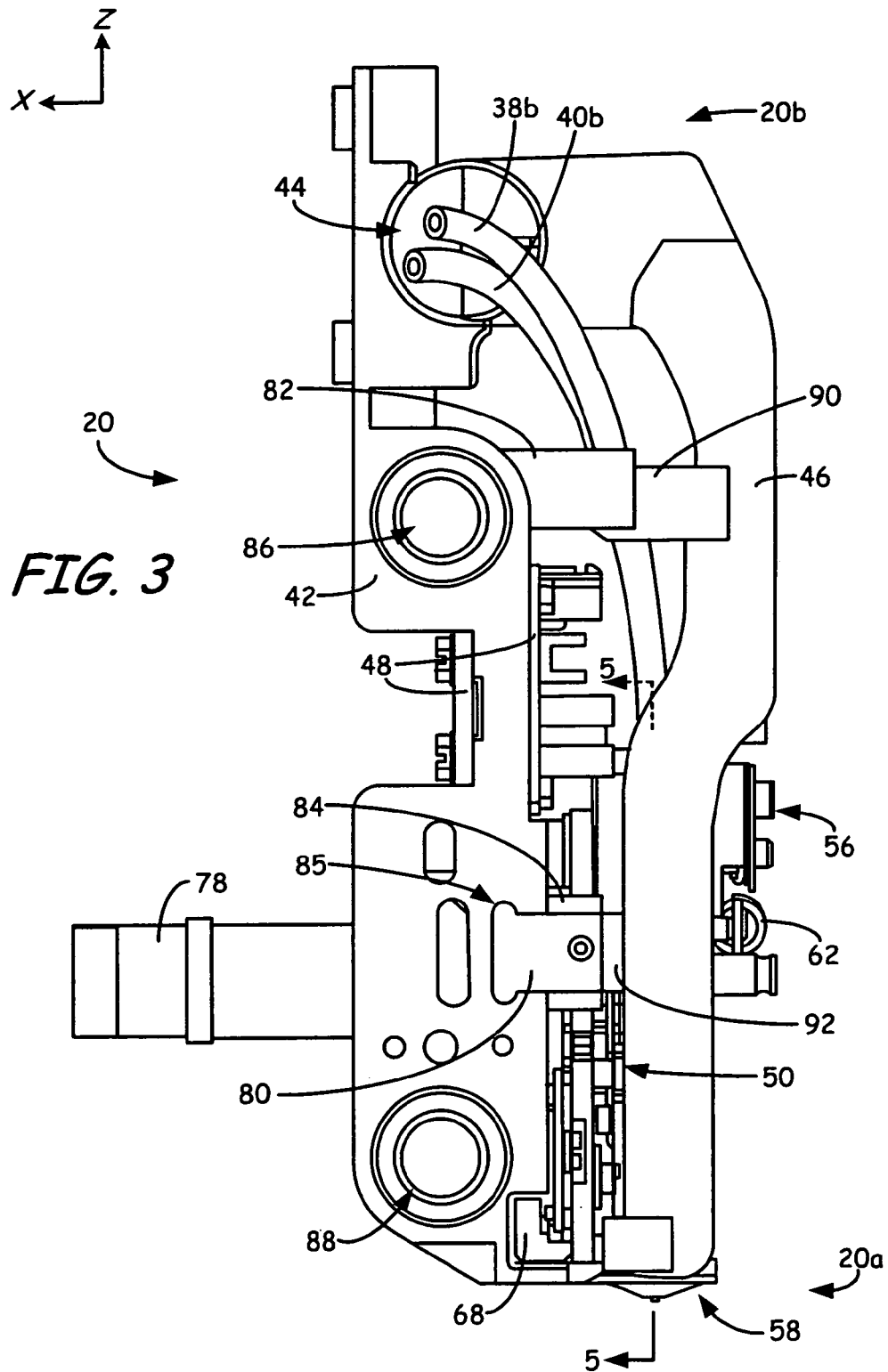
FIG. 3 is a left side view of the extrusion head 20, where the toggle-plate assembly is positioned in the build state.

FIG. 3 is a left side view of extrusion head 20 in which toggle-plate assembly 50 is positioned in the build state. As shown, extrusion head 20 further includes motor 78, which is a drive motor connected to drive wheel 51 (not shown in FIG. 3) for rotating drive wheel 51 during a build process. As discussed above, because toggle-plate assembly 50 is positionable between a build state and a support state, only a single drive wheel (i.e., dive wheel 51) and a single drive motor (i.e., motor 78) are required to alternatively extrude build material and support material.

As further shown in FIG. 3, translator 42 includes casing bracket 80, raised bosses 82 and 84, bracket slot 85, and rail slots 86 and 88. The outer casing of extrusion head 20 (not shown) is connected to translator 42 via casing bracket 80, which inserts into bracket slot 85. Raised bosses 82 and 84 are raised portions of translator 42 on which airflow manifold 46 is disposed. Airflow manifold 46 is secured to raised boss 82 via bracket 90, at to translator 42 via bracket 92. A second set of each of casing bracket 80, bosses 82 and 84, bracket slot 85, and brackets 90 and 92 are located on the right side of extrusion head 20, which are not shown in FIG. 3. Rail slots 86 and 88 are slots that extend laterally through translator 42, through which guide rails 26 extend to support extrusion head 20 within build chamber 12.

Figure 4A:
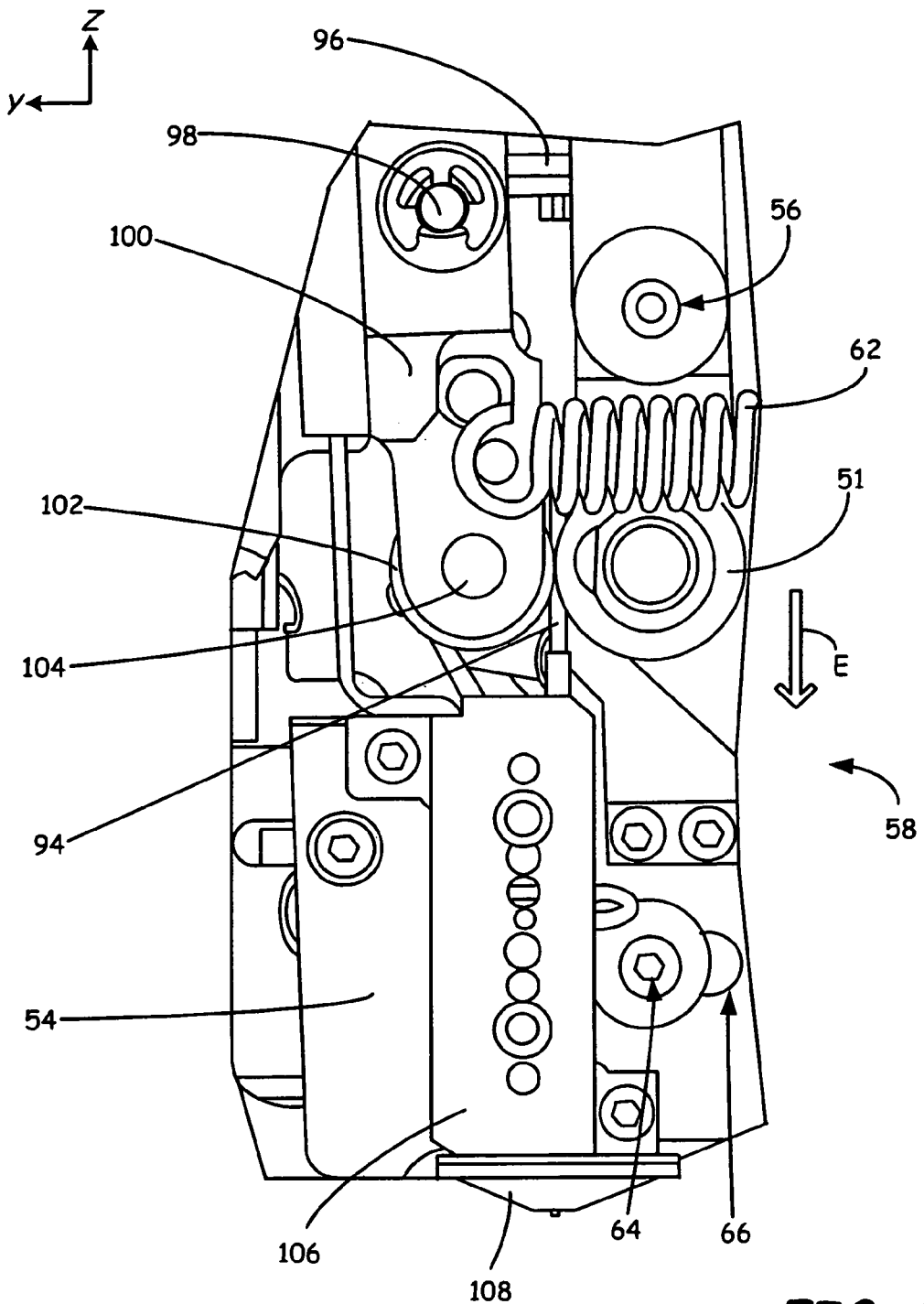
FIG. 4A is an expanded view of a left-portion of the toggle-plate assembly shown in FIG. 2A.

FIG. 4A is an expanded view of the left-portion of toggle-plate assembly 50 as shown above in FIG. 2A, further illustrating build line 58 in use with a filament strand of build material (referred to herein as filament strand 94). As shown top-to-bottom in FIG. 4A, build line 58 includes coupling 96, connection pin 98, support appendage 100, idler wheel 102, axle 104, liquefier block 106, and build tip 108.

Coupling 96 is a connection point in base 54 for securing supply line 38b to build line 58. Support appendage 100 is a brace connected to base 54 via connection pin 98 for supporting idler wheel 102. Idler wheel 102 is a freely-rotating roller, which is axially connected to support appendage 100 via axle 104. As discussed below, idler wheel 102 assists drive wheel 51 in feeding filament strand 94 from build line 38b to liquefier block 106.

Liquefier block 106 is a heating block secured to base 54 for melting filament strand 94 to a desired extrusion viscosity based on a suitable thermal profile along liquefier block 106. Examples of suitable heating blocks for liquefier block 106 are commercially available in fused deposition modeling systems under the trade designation "FDM TITAN" from Stratasys, Inc., Eden Prairie, Minn.

Build tip 108 is an extrusion tip secured to liquefier block 106 at bottom portion 20*a* of extrusion head 20. Build tip 108 has a tip diameter for depositing roads of build material, where the road widths and heights are based in part on the tip diameter. Examples of suitable tip diameters for build tip 108 range from about 250 micrometers (about 10 mils) to about 510 micrometers (about 20 mils).

Prior to extruding build material with toggle-plate assembly 50 positioned in the build state, filament strand 94 (i.e., build material) is manually or automatically fed into build line 58 from supply line 38*b*. This positions a portion of filament strand 94 between drive wheel 51 and idler wheel 102. Motor 78 then rotates drive wheel 51 (in a counter-clockwise direction in FIG. 4A), which causes drive wheel 51 and idler wheel 102 to pull filament strand 94 toward liquefier block 106 (as represented by arrow E).

The rotation of drive wheel 51 by motor 78 continuously feeds filament strand 94 into liquefier block 106. While traveling through liquefier block 106, liquefier block 106 melts filament strand 94 to a desired extrusion viscosity. The un-melted portion of filament strand 94 acts as a plunger that forces the melted build material to extrude out of build tip 108. This allows extrusion head 20 to extrude build material at a desired flow rate generally based on the rotation rate of drive wheel 51.

Figure 4B:
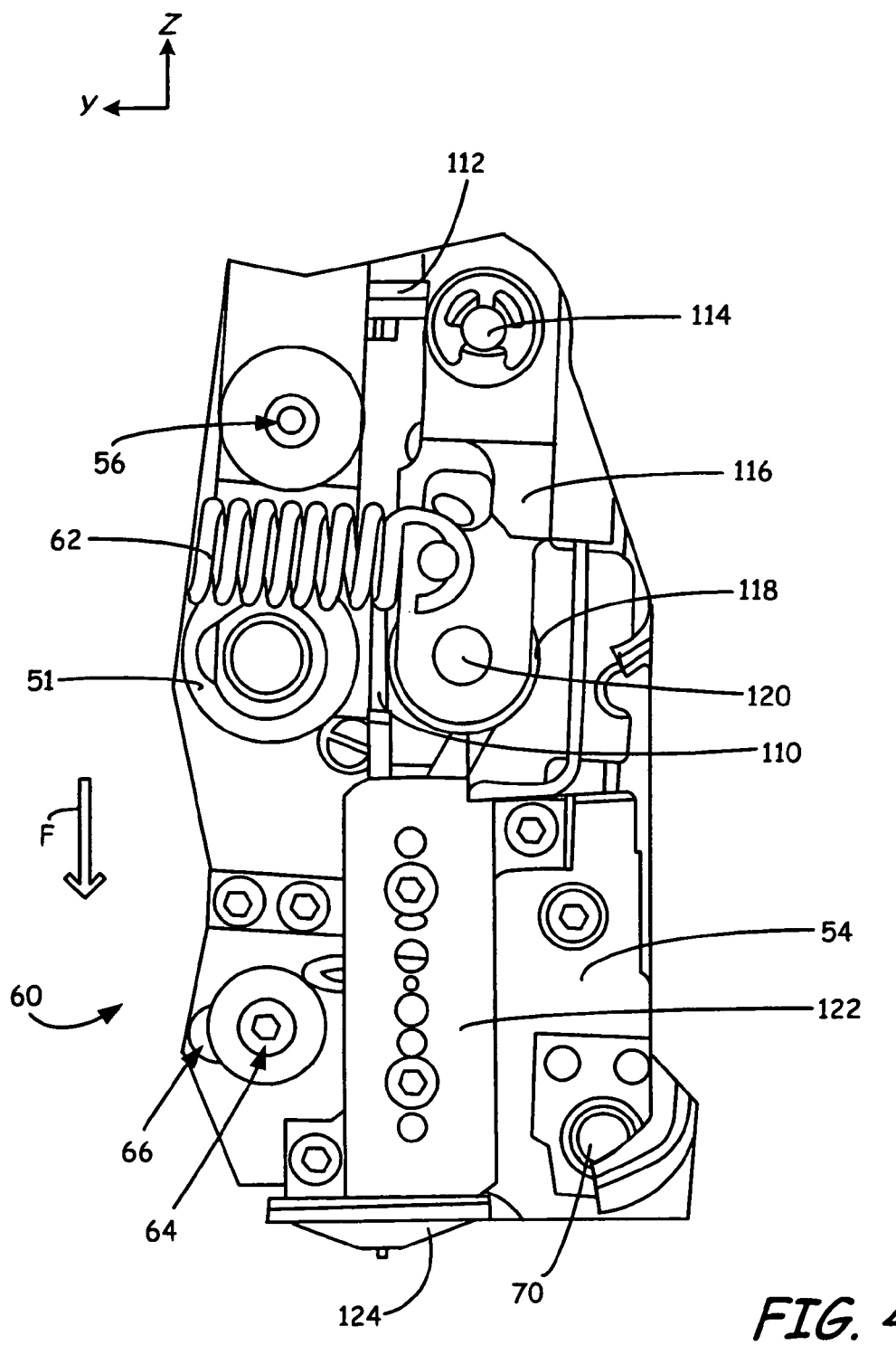
FIG. 4B is an expanded view of a right-portion of the toggle-plate assembly shown in FIG. 2B.

FIG. 4B is an expanded view of the right-portion of toggle-plate assembly 50 as shown above in FIG. 2B, further illustrating support line 60 in use with a filament strand of support material (referred to herein as filament strand 110). As shown top-to-bottom in FIG. 4B, support line 60 includes coupling 112, connection pin 114, support appendage 116, idler wheel 118, axle 120, liquefier block 122, and support tip 124, which generally function in the same manner as the corresponding components of build line 58.

Coupling 112 is a connection point in base 54 for securing supply line 40*b* to support line 60. Support appendage 116 is a brace connected to base 54 via connection pin 114 for supporting idler wheel 118. Idler wheel 118 is a freely-rotating roller, which is axially connected to support appendage 116 via axle 120. Idler wheel 118 assists drive wheel 51 in feeding filament strand 110 from supply line 40*b* to liquefier block 122.

Liquefier block 122 is a heating block secured to base 54 for melting filament strand 110 to a desired extrusion viscosity based on a suitable thermal profile along liquefier block 122. Suitable heating blocks for liquefier block 122 are the same as discussed above for liquefier block 106. Support tip 124 is an extrusion tip secured to liquefier block 122 at bottom portion 20*a* of extrusion head 20. Suitable characteristics for support tip 124 are the same as discussed above for build tip 108.

Prior to extruding support material with toggle-plate assembly 50 positioned in the support state, filament strand 110 (i.e., support material) is manually or automatically fed into build line 60 from supply line 40*b*. This positions a portion of filament strand 110 between drive wheel 51 and idler wheel 118. Motor 78 then rotates drive wheel 51 (in a clockwise direction in FIG. 4B), which causes drive wheel 51 and idler wheel 118 to pull filament strand 110 toward liquefier block 122 (as represented by arrow F).

The rotation of drive wheel 51 by motor 78 continuously feeds filament strand 110 into liquefier block 122. While traveling through liquefier block 122, liquefier block 122 melts filament strand 110 to a desired extrusion viscosity. The un-melted portion of filament strand 110 acts as a plunger that forces the melted support material to extrude out of support tip 124. This allows extrusion head 20 to extrude support material at a desired flow rate generally based on the rotation rate of drive wheel 51.

It is noted that the rotation of drive wheel 51 when engaged with support line 60 is in an opposite rotational direction from the rotation of drive wheel 51 when engaged with build line 58 (i.e., clockwise versus counter-clockwise). This illustrates a benefit of disengaging one of the extrusion lines (i.e., build line 58 in FIG. 4B) when the second extrusion line (i.e., support line 58 in FIG. 4B) is engaged with drive wheel 51.

As shown in FIG. 4B, if build line 58 and support line 60 were both engaged with drive wheel 51, the clockwise rotation of drive wheel 51 would feed filament strand 110 to liquefier block 122. However, the rotation would also feed filament strand 94 in the opposite direction of arrow E, shown above in FIG. 4A. This would disengage filament strand 94 from drive wheel 51 and idler wheel 102, thereby requiring a subsequent reinsertion step. Nonetheless, pivoting toggle-plate assembly 50 around pivot axis 56 between the build state and the support state ensures that at least one of extrusion lines remains disengaged from drive wheel 51 while the second extrusion line is engaged.

Figure 5:
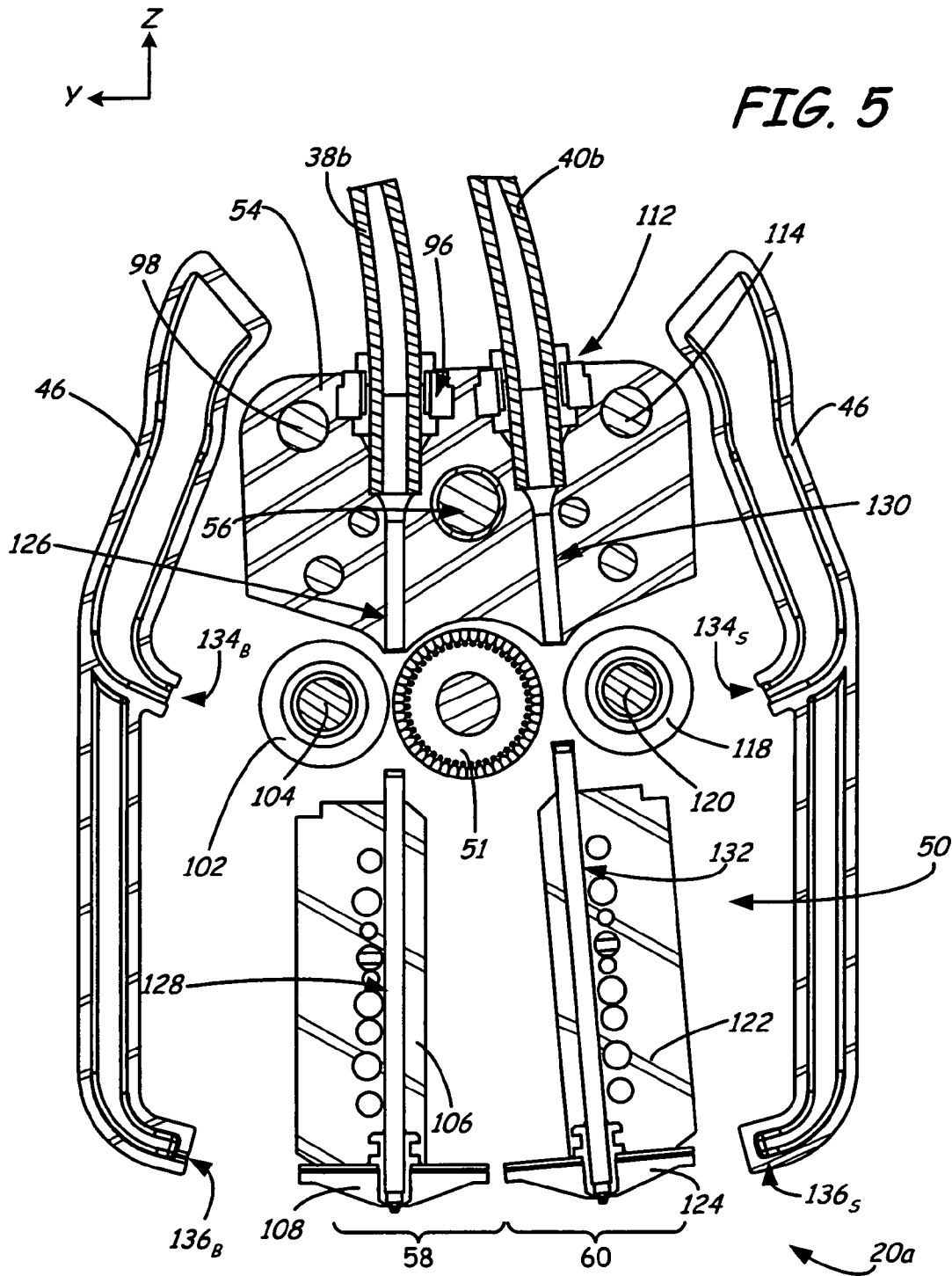
FIG. 5 is a sectional view of section 5-5 taken in FIG. 3, showing the toggle-plate assembly.

FIG. 5 is an expanded sectional view of section 5-5 taken in FIG. 3, further illustrating toggle-plate assembly 50 (non-discussed components omitted for clarity of discussion). As shown, build line 58 further includes feed channel 126 and liquefier channel 128. Feed channel 126 is a channel disposed through base 54, and which has an entrance at coupling 96 and an exit adjacent drive wheel 51 and idler wheel 102. Feed channel 126 provides a pathway for feeding filament strand 94 (not shown in FIG. 5) from supply line 38*b* to drive wheel 51 and idler wheel 102.

Extrusion channel 128 is a channel extending through liquefier block 106, which has an entrance adjacent drive wheel 51 and idler wheel 102, and an exit at build tip 108. Extrusion channel 128 provides a pathway for filament strand 94 to travel through liquefier block 106. In one embodiment, extrusion channel 128 is a separate tubular member that is removably insertable into liquefier block 106. The removable tubular member may be removed and replaced between build processes, thereby simplifying maintenance and cleaning of extrusion head 20. In another embodiment, extrusion channel 128 includes a flared entrance (i.e., a widened entrance) to assist the insertion of filament strand 94.

Similarly, support line 60 also includes feed channel 130 and liquefier channel 132. Feed channel 130 is a channel disposed through base 54, and functions in the same manner as feed channel 126 of build line 58 for feeding filament strand 110 (not shown in FIG. 5) from supply line 40*b* to drive wheel 51 and idler wheel 118. Extrusion channel 132 is a channel extending through liquefier block 122, which also functions in the same manner as extrusion channel 128 of build line 58. The embodiments discussed above for extrusion channel 128 also apply to extrusion channel 132.

As further shown in FIG. 5, while toggle-plate assembly 50 is positioned in the build state, build tip 108 of build line 58 extends generally parallel to the z-axis, which allows build material to be extruded vertically down toward build platform 28. In contrast, support tip 124 of support line 60 is oriented at an angle from the z-axis. This angled orientation results from the pivoting of toggle-plate assembly 50 around pivot axis 56, which vertically raises support tip 124 along the z-axis, thereby reducing the risk of having support tip 124 interfere with the extruded layers during a build process. Alternatively, when toggle-plate assembly 50 is positioned in the support state, the reverse situation occurs (as shown above in FIG. 2B). Support tip 124 extends generally parallel to the z-axis, and build tip 108 is oriented at an angle from the z-axis.

Referring to the engagements between drive wheel 51 and idlers wheels 102 and 118, the distance that idler wheels 102 and 118 are offset from drive wheel 51 in the respective build and support states may vary depending on the type of build and support materials used. The distance is generally a compromise between (1) obtaining good traction of the filament strand between drive wheel 51 and the corresponding idler wheel, and (2) reducing the amount of bending that the filament strand incurs around the idler wheel when drive wheel 51 is disengaged from the idler wheel.

Examples of suitable distances between drive wheel 51 and idler wheel 102 while toggle-plate assembly 50 is positioned in the build state range from about 1 mil to about 5 mils for thermoplastic materials (e.g., high-impact polystyrenes and polyacrylonitrile-butadiene-styrenes), and from about 10 mil to about 15 mil for less compliant materials (e.g., water-soluble materials commercially available under the trade designations "WATERWORKS" and "SOLUBLE SUPPORTS" from Stratasys, Inc., Eden Prairie, Minn.). Suitable distances between drive wheel 51 and idler wheel 118 while toggle-plate assembly 50 is positioned in the support state include the same suitable ranges as discussed for drive wheel 51 and idler wheel 102.

As further shown in FIG. 5, airflow manifold 46 further includes exit orifices $134_B$, $134_S$, $136_B$, and $136_S$. Exit orifices $53_B$ and $53_S$ (shown above in FIG. 2A), and $134_B$ and $134_S$ are directed at the entrances of extrusion pathways 128 and 132, and provide cooling air from airflow manifold 46 to the entrances of extrusion pathways 128 and 132. This reduces the risk of filament strands 94 and 110 from melting at the respective entrances of extrusion pathways 128 and 132.

Exit orifices $136_B$ and $136_S$ are respectively directed at build tip 108 and support tip 124, and provide cooling air from airflow manifold 46 to build tip 108 and support tip 124 to cool down the extruded flows of build and support material. This allows the extruded flows to readily fuse to the previously deposited roads, and also reduces the risk of excess material flowing out of build tip 108 and support tip 124 after drive wheel 51 stops rotating. Accordingly, airflow manifold 46 is arranged to provide cooling air to multiple locations within and around extrusion head 20 from a single source (i.e., cooling line 36).

Figure 6A:
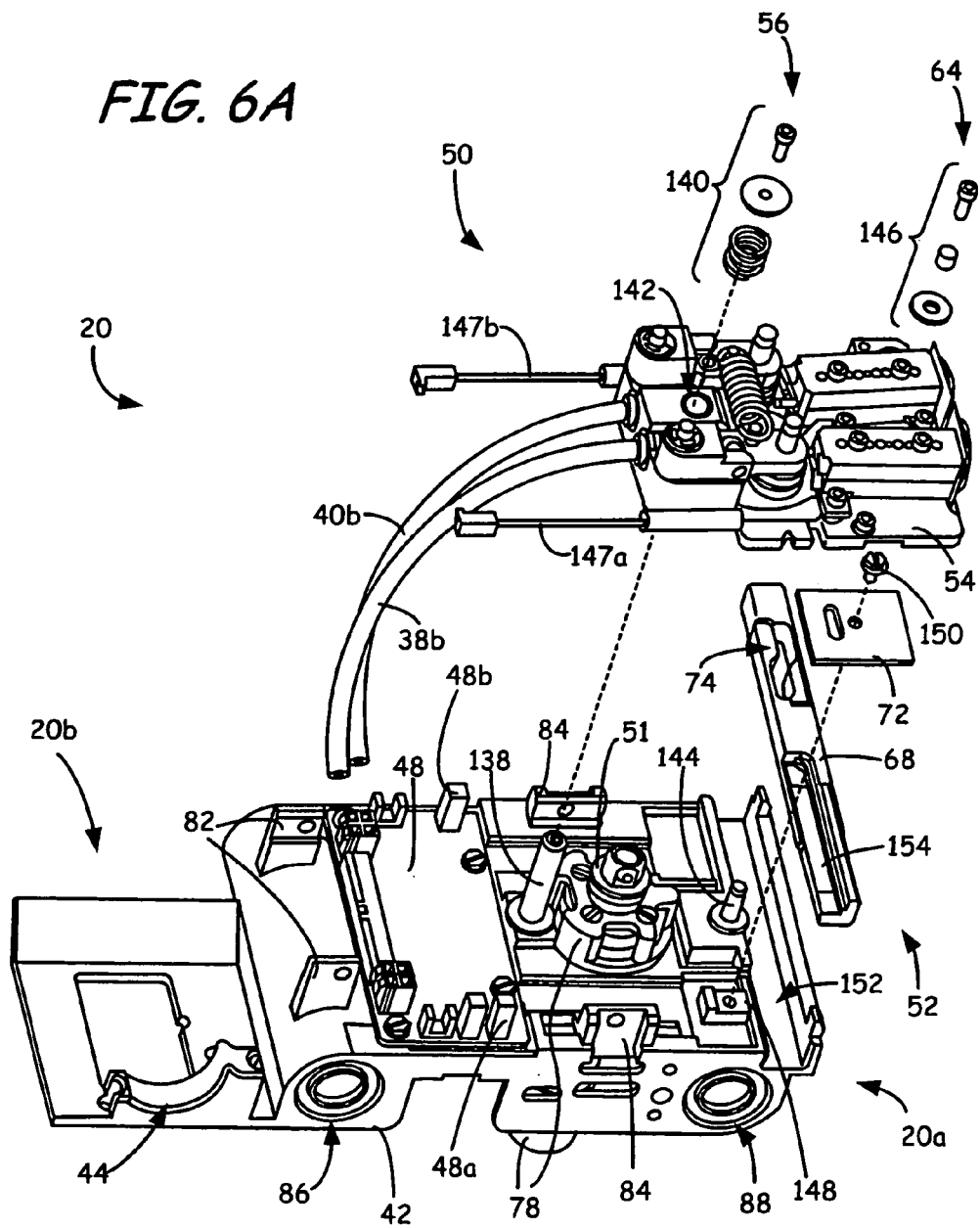
FIG. 6A is a front exploded view of the extrusion head.
Figure 6B:
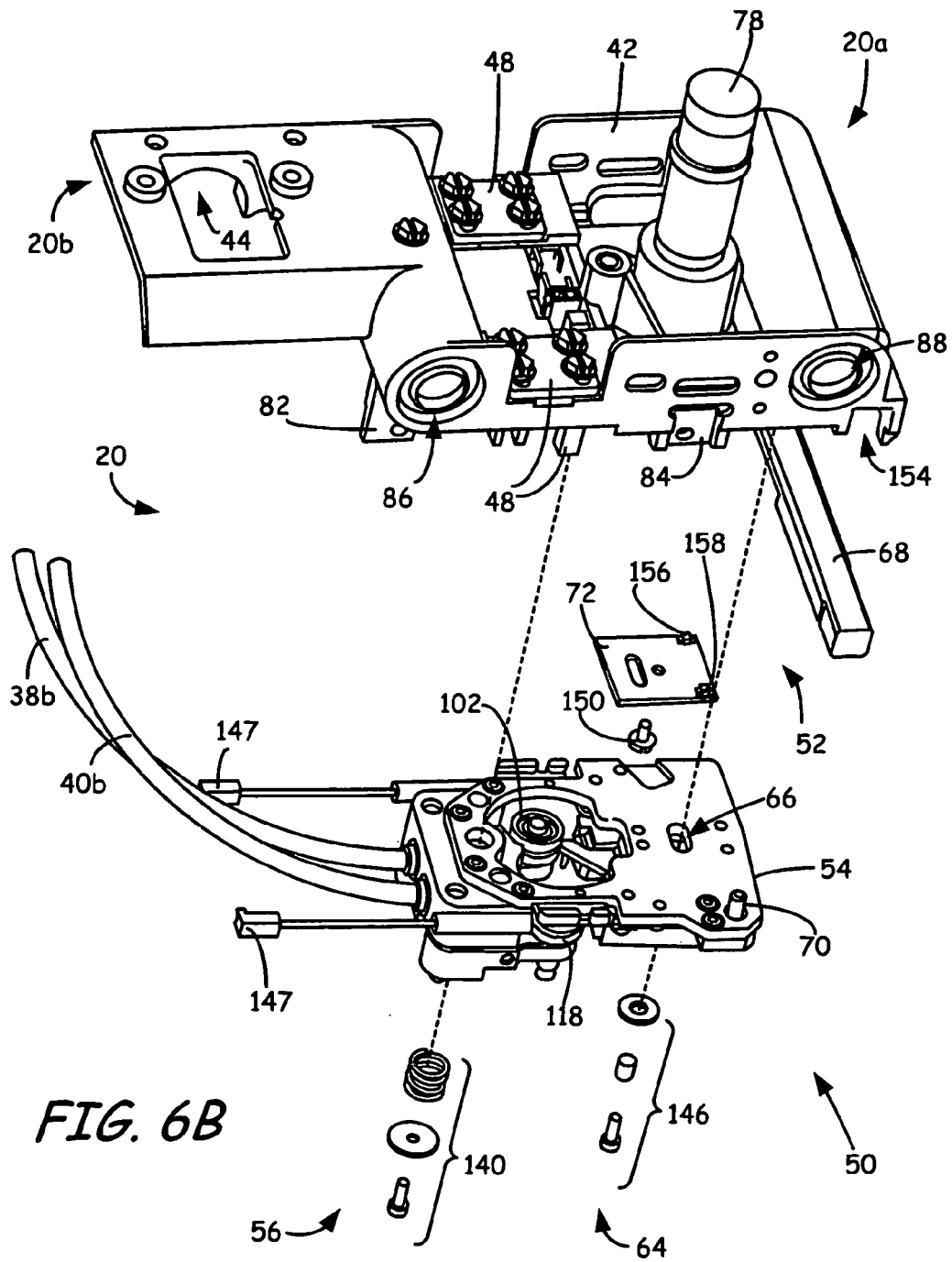
FIG. 6B is a rear exploded view of the extrusion head.

FIGS. 6A and 6B are respectively top and bottom exploded views of extrusion head 20 (airflow manifold 46 omitted for clarity), further illustrating the interconnections between translator 42 and toggle-plate assembly 50. As shown in FIG. 6A, pivot axis 56 includes extension 138 and retention component 140 (i.e., a spring, washer, and pin assembly). Extension 138 inserts into hole 142 of toggle-plate assembly 50, and is retained with retention component 140. This allows toggle-head assembly 50 to pivot around pivot axis 56 for switching between the build state, the neutral state, and the support state.

As further shown in FIG. 6A, tab member 64 includes extension 144 and retention component 146 (i.e., a spring, washer, and pin assembly). Extension 144 inserts through slot 66 (not shown in FIG. 6A) of toggle-plate assembly 50, and is retained with retention component 146. As discussed above, tab member 64 secures toggle-plate assembly 50 to translator 42, while also allowing toggle-plate assembly 50 to pivot around pivot axis 56.

Toggle-plate assembly 50 also includes thermocouple wires 147a and 147b, and control board 48 includes connection points 48a and 48b. Thermocouple wires 147a and 147b bend and respectively connect to connection points 48a and 48b. This allows control board 48 to monitor the thermal profiles of liquefier blocks 106 and 122.

Toggle switch 52 further includes raised boss 148, screw 150, and pathway 152. Raised boss 148 is a base component secured to translator 42 adjacent bottom portion 20a, which retains sensor plate 72 via screw 150. Pathway 152 extends laterally along translator 42 adjacent bottom portion 20a, and is the portion of translator 42 in which toggle bar 68 is slidably retained. As discussed below, toggle bar 68 further includes sensor surface 154, which is used with sensor plate 72 to identify which state toggle-plate assembly 50 is positioned in. When toggle bar 68 is retained in pathway 154 and sensor plate 72 is secured to raised boss 148, sensor plate 72 is disposed over sensor surface 154.

As shown in FIG. 6B, track pin 70 extends through base 54 of toggle-head assembly 50, adjacent bottom portion 20a. Furthermore, sensor plate 72 includes sensors 156 and 158, which are in signal communication with control board 48. As discussed below, sensors 156 and 158 are optical sensors configured to detect changes along sensor surface 154 (not shown in FIG. 6B) as toggle bar 68 slides along pathway 152. This allows sensors 156 and 158 to identify which state toggle-plate assembly 50 is positioned in.

Figure 7A:
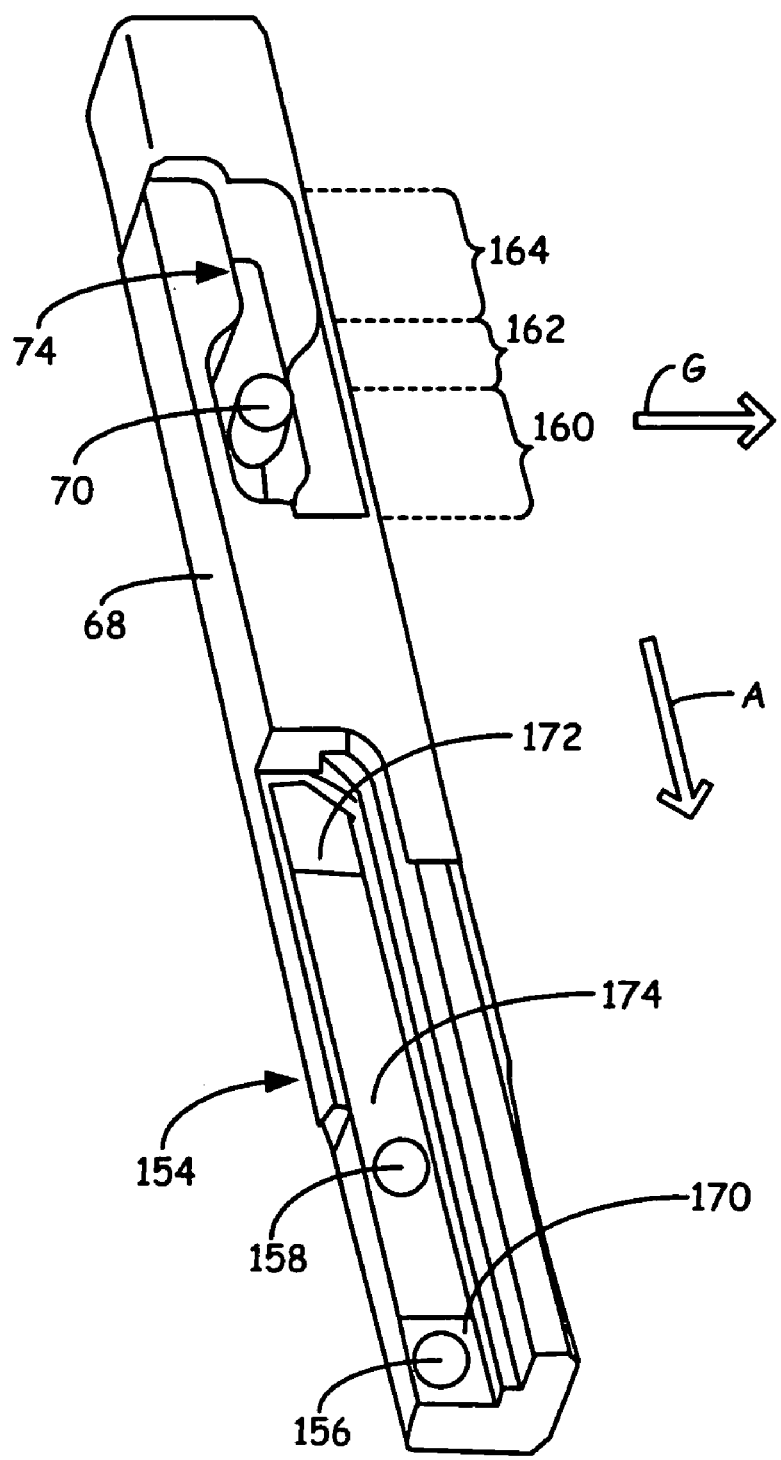
FIGS. 7A-7E are expanded views of a toggle bar of the extrusion head in use for positioning the toggle-plate assembly between the build state and the support state.
Figure 7B:
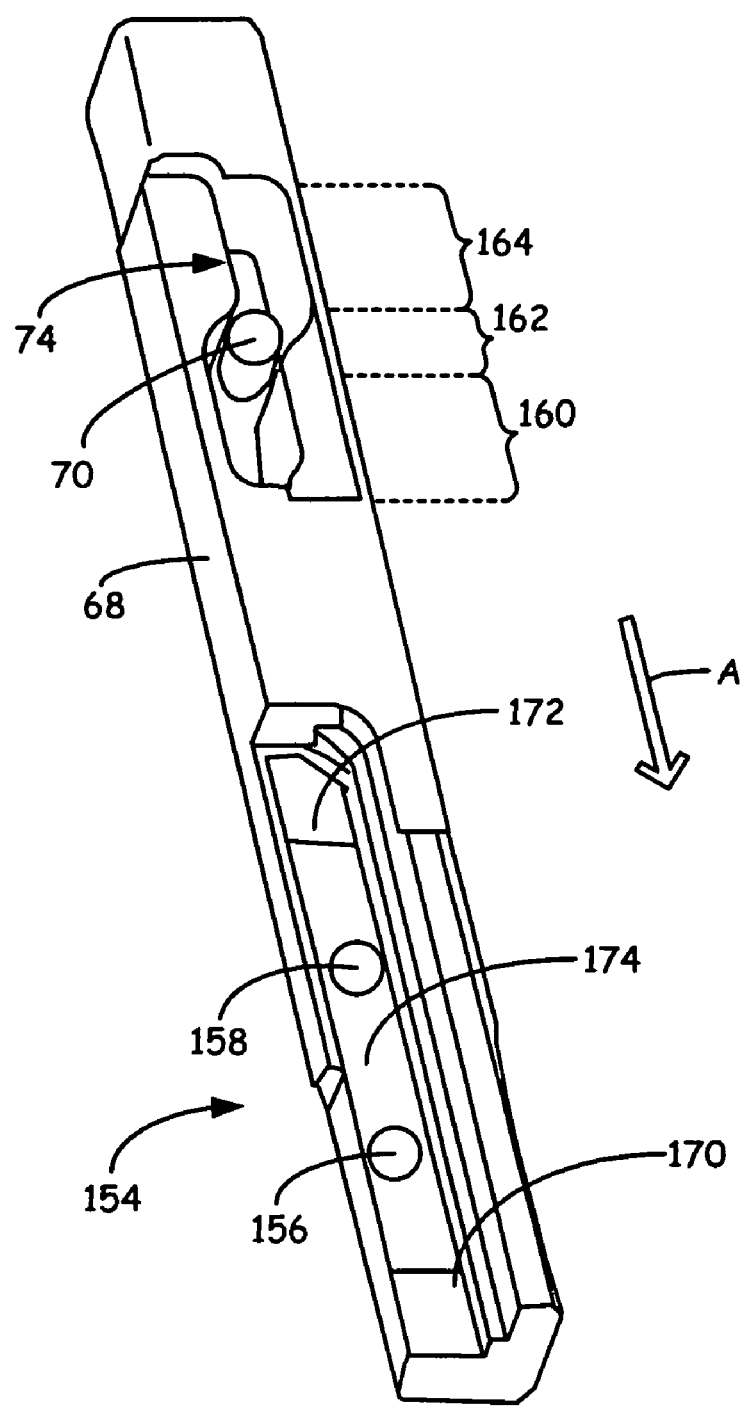
Figure 7C:
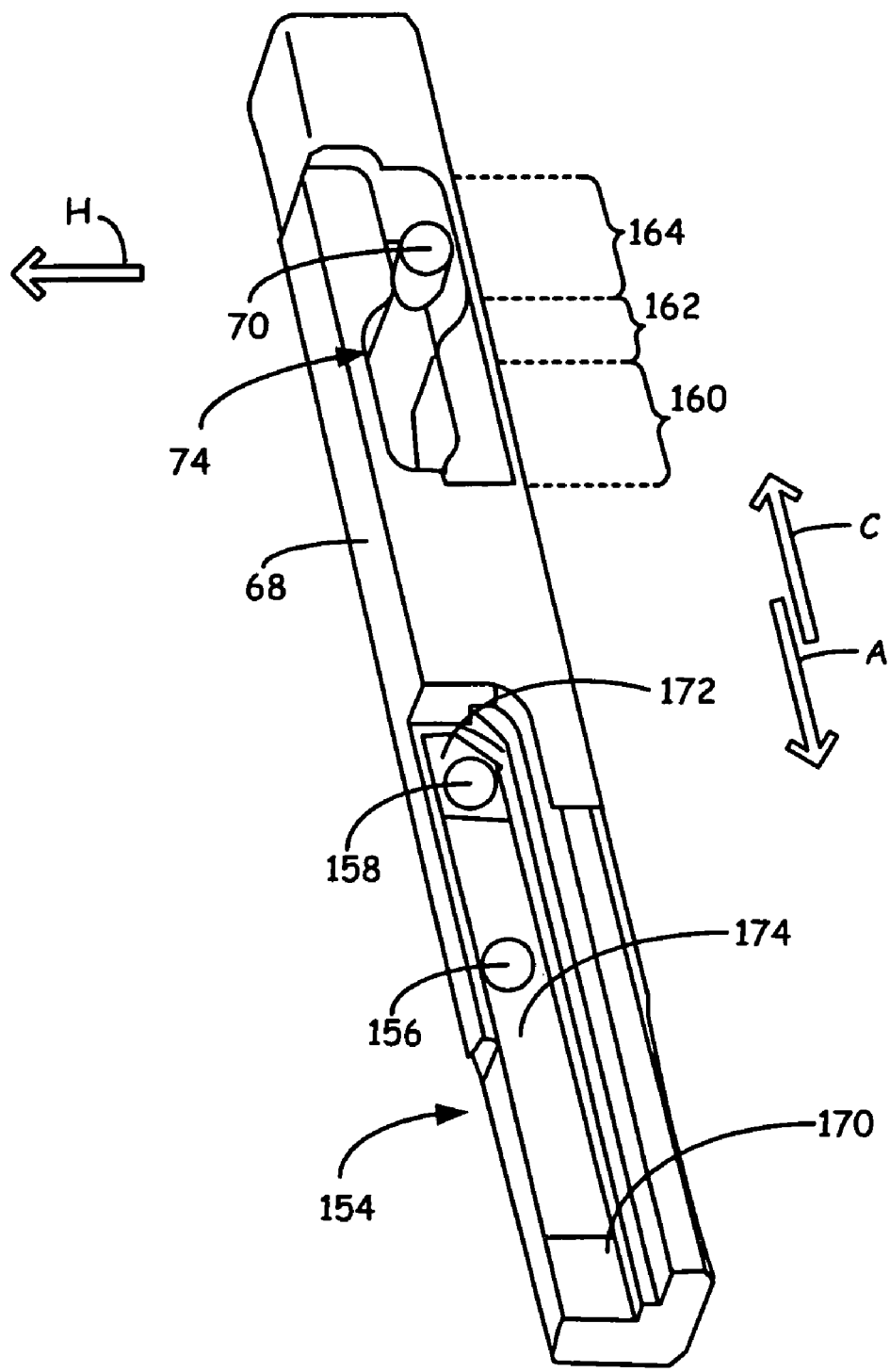

FIGS. 7A-7C are expanded views of toggle bar 68 in use with track pin 70 and sensors 156 and 158, where the expanded views correspond to the views shown above in FIG. 6A. As discussed above, toggle bar 68 includes track 74 and sensor surface 154.

Track 74 includes first zone 160, transition region 162, and second zone 164, where transition region 162 is disposed between first zone 160 and second zone 164. First zone 160 is the area in which track pin 70 is disposed when toggle-plate assembly 50 is positioned in the build state (as shown in FIG. 7A). Similarly, second zone 160 is the area in which track pin 70 is disposed when toggle-plate assembly 50 is positioned in the support state. Transition region 162 defines the "S"-shape of track 74 and is used to switch toggle-plate assembly 50 to the neutral state from either the build state or the support state.

Sensor surface 154 includes reflective portions 170 and 172, disposed on opposing sides of non-reflective portion 174. Reflective portions 170 and 172 are light-reflective surfaces that are capable of reflecting substantially more light than non-reflective portion 174. Sensors 156 and 158 are optical sensors capable of the intensity of light reflected from sensor surface 154. As a result, sensors 156 and 158 can detect the changes in the intensity of reflected light as toggle bar 86 slides along pathway 152 (not shown in FIG. 7A). This allows sensors 156 and 158 to identify which state toggle-plate assembly 50 is positioned in.

In the embodiment discussed below, sensors 156 and 158 are configured to identify which state toggle-plate assembly 50 is positioned in based on predefined patterns stored in control board 48 (not shown in FIG. 7A). For example, when sensor 156 is disposed over a reflective portion (e.g., reflective portion 170) and sensor 158 is disposed over non-reflective portion 174 (as shown in FIGS. 7A and 7B), this combination of received signals is predefined as the build state. This predefined pattern corresponds to the position of toggle-plate assembly 50 in which build line 58 is engaged with drive wheel 51 for extruding build material.

Similarly, when sensors 156 and 158 are both disposed over non-reflective portion 174 (as shown below in FIGS. 7C and 7D), this combination of received signals is predefined as the neutral state. This predefined pattern corresponds to the position of toggle-plate assembly 50 in which build line 58 and support line 60 are disengaged from drive wheel 51.

Finally, when sensor 156 is disposed over non-reflective portion 174 and sensor 158 is disposed over a reflective portion (e.g., reflective portion 172) (as shown below in FIG. 7E), this combination of received signals is predefined as the support state. This predefined pattern corresponds to the position of toggle-plate assembly 50 in support line 60 is engaged with drive wheel 51 for extruding support material.

As shown in FIG. 7A, toggle-plate assembly 50 is positioned such that track pin 70 is disposed in first zone 160 of track 74. While track pin 70 is disposed in first zone 160, the biasing force of spring 62 on toggle-plate assembly 50 (shown above in FIG. 2A) biases track pin 70 in the direction of arrow G, which is perpendicular to the path of first zone 160.

Correspondingly, sensor 156 is disposed above reflective portion 170 and sensor 158 is disposed above non-reflective portion 174. As a result, control board 48 identifies that toggle-plate assembly 50 is in the build state. While toggle-plate assembly 50 is positioned in this state, drive wheel 51 and build line 58 may extrude build material to build 3D object 30.

When controller 14 directs extrusion head 20 to switch to the support state, toggle bar 68 slides along pathway 152 in the direction of arrow A (corresponding to arrow A in FIG. 2A). The sliding of toggle bar 68 causes track pin 70 to pass into transition region 162 (as shown in FIG. 7B), thereby pivoting toggle-plate assembly 50 around pivot axis 56 (in a clockwise direction).

The rotational distance that toggle-plate assembly pivots when track pin 70 passes into transition region 162 corresponds to the distance required to disengage build line 58 from drive wheel 51. Therefore, when track pin 70 passes into transition region 162, toggle-plate assembly switches from the build state to the neutral state. While in transition region 162, the biasing force of spring 62 is balanced, thereby eliminating the biasing of track pin 70. This stabilizes toggle-plate assembly 50 in the neutral state.

Correspondingly, when track pin 70 passes into transition region 162, sensors 156 and 158 are both disposed above non-reflective portion 174. Therefore, control board 48 informs controller 14 that toggle-plate assembly 50 has switched to the neutral state.

As additional force is applied, toggle bar 68 continues to move in the direction of arrow A, thereby pivoting toggle-plate assembly (in a clockwise direction) until track pin 70 passes into second zone 164 (as shown in FIG. 7C). The rotational distance that toggle-plate assembly pivots as track pin 70 passes into second zone 164 corresponds to the distance required to engage support line 60 with drive wheel 51. Therefore, when track pin 70 passes into second zone 164, toggle-plate assembly switches from the neutral state to the support state. While track pin 70 is disposed in second zone 164, the biasing force of spring 62 on toggle-plate assembly 50 (shown above in FIG. 2B) biases track pin 70 in the direction of arrow H, which is perpendicular to the path of second zone 164, and is opposite of arrow G (shown above in FIG. 7A).

Correspondingly, when track pin 70 passes into second zone 164, sensors 156 is disposed above non-reflective portion 174 and sensor 158 is disposed above reflective portion 172. Therefore, control board 48 informs controller 14 that toggle-plate assembly 50 has switched to the support state. While toggle-plate assembly 50 is positioned in this state, drive wheel 51 and support line 60 may extrude support material to build support structure 32.

Figure 7D:
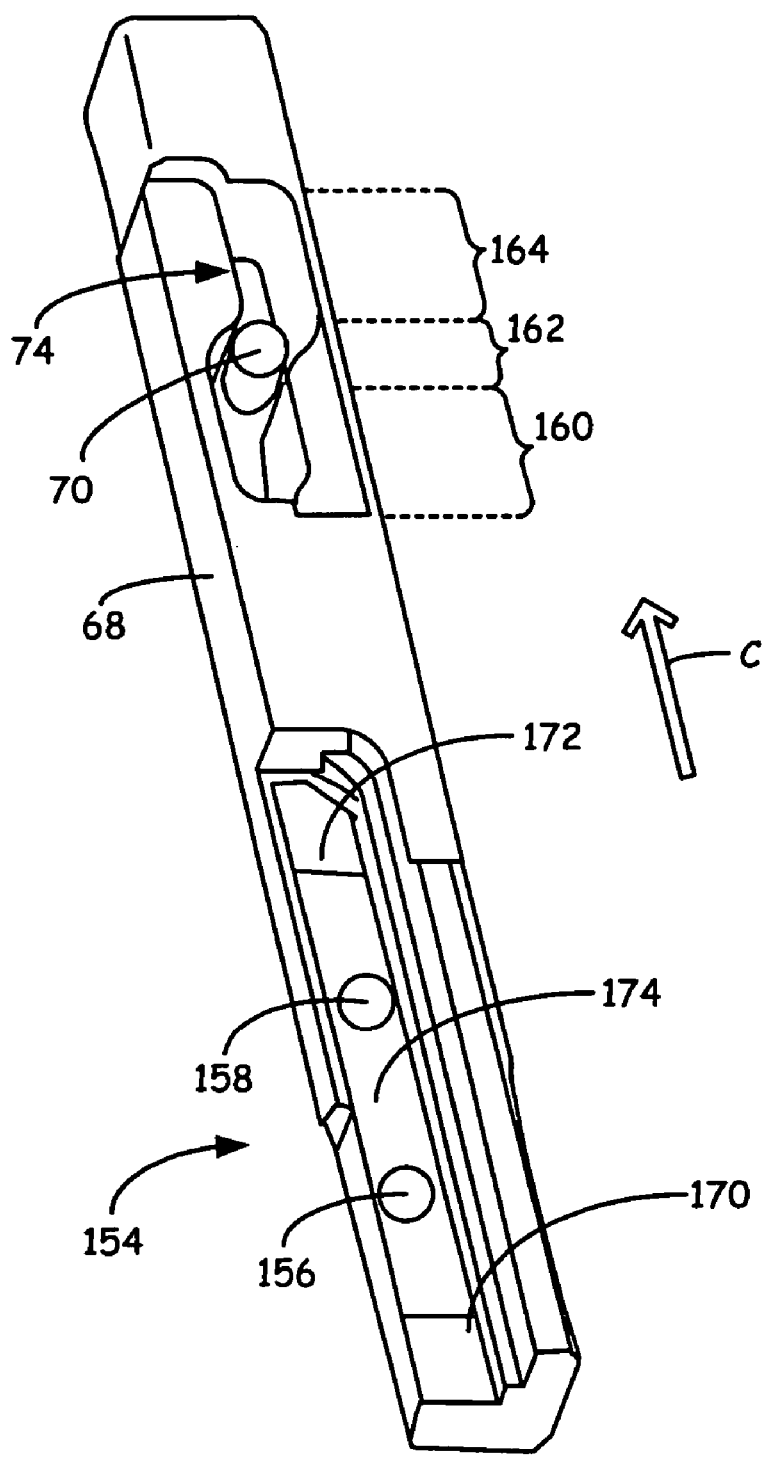

When controller 14 directs extrusion head 20 to switch back to the build state, toggle bar 68 then slides along pathway 152 in the direction of arrow C (corresponding to arrow C in FIG. 2B), which is opposite direction of arrow A. The sliding of toggle bar 68 causes track pin 70 to pass from second zone 164 back into transition region 162 (as shown in FIG. 7D), thereby pivoting toggle-plate assembly 50 around pivot axis 56 (in a counter-clockwise direction).

The rotational distance that toggle-plate assembly pivots when track pin 70 passes into transition region 162 corresponds to the distance required to disengage support line 60 from drive wheel 51. Therefore, when track pin 70 passes into transition region 162, toggle-plate assembly switches from the support state back to the neutral state. Correspondingly, in this state, sensors 156 and 158 are both disposed above non-reflective portion 174. Therefore, control board 48 informs controller 14 that toggle-plate assembly 50 has switched back to the neutral state.

Figure 7E:
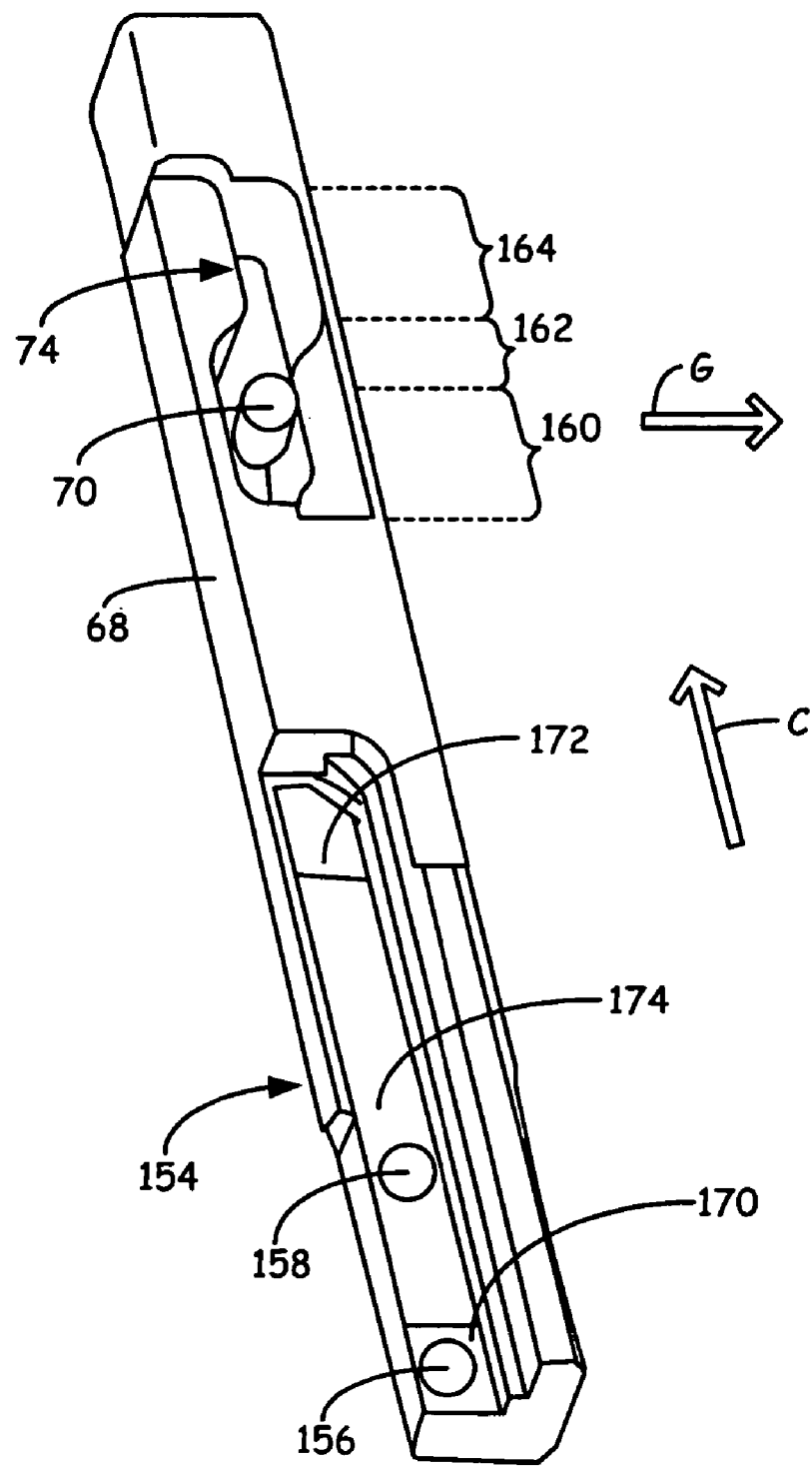

As additional force is applied, toggle bar 68 continues to move in the direction of arrow C, thereby pivoting toggle-plate assembly (in a counter-clockwise direction) until track pin 70 passes into first zone 162 (as shown in FIG. 7E). The rotational distance that toggle-plate assembly pivots as track pin 70 passes into first zone 160 corresponds to the distance required to engage build line 58 with drive wheel 51. Therefore, when track pin 70 passes into second zone 164, toggle-plate assembly switches from the neutral state to the build state. This again causes the biasing force of spring 62 to bias track pin 70 in the direction of arrow G.

Correspondingly, when track pin 70 passes back into first zone 160, sensor 156 is disposed above reflective portion 170 and sensor 158 is disposed above non-reflective portion 174. Therefore, control board 48 informs controller 14 that toggle-plate assembly 50 has switched back to the build state. While toggle-plate assembly 50 is positioned in this state, drive wheel 51 and build line 60 may again extrude build material to build 3D object 30.

Prior to starting a build process, toggle system 52 may be calibrated to ensure that the predefined patterns of sensors 156 and 158 accurately correspond to the build state, the neutral state, and the support state. A calibration may be performed by slowly sliding toggle bar along pathway 152 and determining the transition points where sensors 156 and 158 identify changes in sensor surface 154.

The predetermined patterns of sensors 156 and 158 are then generated based on the transition points, and may include threshold points beyond the transition points (e.g., about 40 mils) to provide safety ranges. The safety ranges ensure that sensors 156 and 158 are fully beyond the transition points before identifying switches in the states of toggle-plate assembly 50. Once the predetermined patterns are generated, extrusion head 20 may then operate at normal speeds for selectively extruding build material and support material.

Toggle switch 52 provides a suitable arrangement for pivoting toggle-plate assembly 50 between the build state, the neutral state and the support state. Additionally, toggle switch 52 provides a suitable means for identify which state toggle-plate assembly 50 is positioned in, thereby allowing controller 14 direct the extrusion head 20 to switch between extruding build material and extruding support material with the use of a single drive motor (i.e., motor 78).

In alternative embodiments, sensors 156 and 158 may identify which state toggle-plate assembly 50 is positioned in a variety of manners. In an additional alternative embodiment, sensors 156 and 158 may be replaced with a single sensor 158 that detects the changes in the intensity of reflected light as toggle bar 86 slides along pathway 152. Moreover, sensors 156 and 158 may alternatively be non-optical sensors that also are capable of identifying which state toggle-plate assembly 50 is positioned in (e.g., proximity sensors).

While extrusion head 20 is discussed above with the use of two extrusion lines (i.e., build line 58 and support lines 60), alternative extrusion heads of the present invention may include additional toggle-plate assemblies that extend along an axis of motor 78. This allows a single motor (i.e., motor 78) to rotate additional drive wheels that are aligned with the additional toggle-plate assemblies.

In these alternative embodiments, each additional toggle-plate assembly includes a toggle switch that positions the given toggle-plate assembly between a build state, a neutral state, and a support state. As such, while a given additional toggle-plate is positioned in a build state or a support state, the remaining toggle-plate assemblies may be positioned in the neutral states, thereby preventing multiple simultaneous extrusions. These alternative embodiments are beneficial for building 3D objects with different build materials and/or different color materials in a single build process.

In another alternative embodiment, drive wheel 51 may be replaced with multiple drive wheels extending along the axis of motor 78, in which each extrusion line (e.g., build line 58 or support line 60) is engagable with a single drive wheel. As such, when toggle-plate assembly 50 is positioned in the build state, build line 58 is engaged with a first drive wheel and support line 60 is disengaged from a second drive wheel. Alternatively, when toggle-plate assembly 50 is positioned in the support state, support line 60 is engaged with the second drive wheel and build line 60 is disengaged from the first drive wheel. This alternative embodiment also allows the use of a single drive motor (e.g., motor 78).

Although the present invention has been described with reference to preferred embodiments, workers skilled in the art will recognize that changes may be made in form and detail without departing from the spirit and scope of the invention.

The invention claimed is:

1. An extrusion head comprising:
at least one drive wheel; and
an assembly positionable between at least a first state and a second state, the assembly comprising:
a first extrusion line configured to engage the at least one drive wheel while the assembly is positioned in the first state; and
a second extrusion line configured to engage the at least one drive wheel while the assembly is positioned in the second state;
wherein the at least one drive wheel rotates in a first rotational direction when engaged with the first extrusion line and rotates in a second rotational direction when engaged with the second extrusion line, the second rotational direction being opposite the first rotational direction.

2. The extrusion head of claim 1, wherein the first extrusion line comprises:
an idler wheel disposed adjacent the at least one drive wheel while the assembly is positioned in the first state;
a liquefier block having an entrance channel and an exit channel, the entrance channel being adjacent the idler wheel; and
an extrusion tip disposed adjacent the exit channel of the liquefier block.

3. The extrusion head of claim 1, further comprising a toggle switch configured to move the assembly between at least the first state and the second state.

4. The extrusion head of claim 3, wherein the toggle switch comprises a toggle bar slidable between a first point and a second point for positioning the assembly between at least the first state and the second state.

5. The extrusion head of claim 4, wherein the toggle bar comprises a track configured to engage with the assembly.

6. The extrusion head of claim 1, further comprising a sensor for identifying the state in which the assembly is positioned.

7. The extrusion head of clam 1, wherein the at least one drive wheel is a single drive wheel.

8. The extrusion head of claim 1, further comprising an airflow manifold having a plurality of exit orifices.

9. An extrusion head comprising:
a translator;
a drive wheel rotatably connected to the translator;
an assembly pivotally connected to the translator, and comprising a first extrusion line and a second extrusion line; and
a toggle switch connected to the translator and engaged with the assembly for positioning the assembly in at least a first state and a second state, wherein the first extrusion line is configured to engage the drive wheel while the assembly is positioned in the first state, and the second extrusion line is configured to engage the drive wheel while the assembly is positioned in the second state.

10. The extrusion head of claim 9, wherein the first extrusion line comprises:
an idler wheel disposed adjacent the drive wheel while the assembly is positioned in the first state;
a liquefier block having an entrance channel and an exit channel, the entrance channel being adjacent the idler wheel; and
an extrusion tip disposed adjacent the exit channel of the liquefier block.

11. The extrusion head of claim 9, wherein the toggle switch comprises a toggle bar slidable relative to the translator.

12. The extrusion head of claim 11, wherein the toggle bar comprises a track configured to engage with the assembly for pivoting the assembly relative to the translator.

13. The extrusion head of claim 1, wherein the toggle switch comprises a sensor configured to identify a state in which the assembly is positioned.

14. The extrusion head of claim 13, wherein the toggle switch further comprises a toggle bar slidable relative to the translator, and wherein the sensor is configured to detect the sliding of the toggle bar.

15. An extrusion head comprising:
a translator;
a toggle switch connected to the translator and configured to move through a plurality of positions including a first state position and a second state position;
a drive wheel rotatably connected to the translator;
a first wheel moveable relative to the translator and configured to engage the drive wheel when the toggle switch is positioned in the first state position; and
a second wheel moveable relative to the translator and configured to engage the drive wheel when the toggle switch positioned in the second state position.

16. The extrusion head of claim 15, and further comprising:
a first liquefier block having an entrance channel and an exit channel, the entrance channel of the first liquefier block being adjacent the first wheel; and
a first extrusion tip disposed adjacent the exit channel of the first liquefier block.

17. The extrusion head of claim 16, and further comprising:
a second liquefier block having an entrance channel and an exit channel, the entrance channel of the second liquefier block being adjacent the second wheel; and
a second extrusion tip disposed adjacent the exit channel of the second liquefier block.

18. The extrusion head of claim 15, wherein the toggle switch comprises a toggle bar slidable relative to the translator.

19. The extrusion head of claim 15, and further comprising a toggle assembly engaged with the first wheel, the second wheel, and the toggle switch, wherein the toggle assembly is configured to move the first wheel to engage the drive wheel when the toggle switch positioned in the first state position, and wherein the toggle assembly is further configured to move the second wheel to engage the drive wheel when the toggle switch is positioned in the second state position.

20. The extrusion head of clam 15, wherein the drive wheel is configured to rotate in a first rotational direction when engaged with the first wheel and configured to rotate in a second rotational direction when engaged with the second wheel, the second rotational direction being opposite the first rotational direction.

* * * * *